US005279880A

United States Patent [19]

Cohart

[11] Patent Number: 5,279,880

[45] Date of Patent: * Jan. 18, 1994

[54] MAT STRUCTURE AND METHOD OF MATTING A PICTURE

[76] Inventor: Richard M. Cohart, 2215-R Market St., #158, San Francisco, Calif. 94114

[ * ] Notice: The portion of the term of this patent subsequent to Dec. 24, 2008 has been disclaimed.

[21] Appl. No.: 796,492

[22] Filed: Nov. 22, 1991

Related U.S. Application Data

[63] Continuation-in-part of Ser. No. 459,053, Dec. 29, 1989, Pat. No. 5,074,067.

[51] Int. Cl.[5] .......................... B44C 5/02; B32B 3/24

[52] U.S. Cl. .................................... 428/138; 428/13; 428/68; 428/131; 428/134; 428/137; 428/189; 428/198; 428/60; 428/195; 428/913.3; 40/158.1; 40/156; 40/152.1; 40/159; 40/155; 40/27.5; 40/152

[58] Field of Search .................. 428/13, 68, 131, 134, 428/137, 138, 189, 198, 60, 195, 913.3; 40/158.1, 156, 152.1, 152, 159, 155, 27.5

[56] References Cited

U.S. PATENT DOCUMENTS

| | | | |
|---|---|---|---|
| 154,581 | 9/1874 | Bushnell | 40/158.1 |
| 452,911 | 5/1891 | Bainbridge | 40/158.1 |
| 842,272 | 1/1907 | Thomas | 40/158.1 |
| 1,358,916 | 11/1920 | Anderson | 40/158.1 |
| 2,092,348 | 9/1937 | Cross | 40/152 |
| 2,172,273 | 9/1939 | Chilcote | 40/152.1 |
| 2,179,699 | 11/1939 | McKeown | 40/152 |
| 2,240,209 | 4/1941 | Cross | 40/152.1 |
| 2,458,349 | 1/1949 | Cross | 40/154 |
| 2,603,018 | 7/1952 | Cross | 40/158.1 |
| 2,639,531 | 5/1953 | Engemann | 40/158.1 |
| 2,984,922 | 5/1961 | Ladenburger et al. | 40/159 |
| 3,188,762 | 6/1965 | Morrill | 40/158.1 |
| 3,382,595 | 5/1968 | Shore | 40/158.1 |
| 3,444,638 | 5/1969 | Jahn | 40/158.1 |
| 3,707,053 | 12/1972 | Itano | 40/152.1 |
| 3,713,238 | 1/1973 | Hyman et al. | 40/158.1 |
| 3,787,992 | 1/1974 | Leonhardt | 40/152 |
| 3,813,799 | 6/1974 | Caravello | 40/152 |
| 4,378,647 | 4/1983 | Stancato | 40/158.1 |
| 4,831,756 | 5/1989 | Huang et al. | 40/158.1 |
| 4,947,565 | 8/1990 | Shadwell | 40/158.1 |
| 5,074,067 | 12/1991 | Cohart | 40/158.1 |

FOREIGN PATENT DOCUMENTS

| | | |
|---|---|---|
| 3005628 | 9/1980 | Fed. Rep. of Germany . |
| 805199 | 11/1936 | France . |
| 91/09743 | 11/1991 | PCT Int'l Appl. . |
| 910102 | 11/1962 | United Kingdom . |
| 941167 | 11/1963 | United Kingdom . |

*Primary Examiner*—Ellis P. Robinson
*Assistant Examiner*—William P. Watkins, III
*Attorney, Agent, or Firm*—Skjerven, Morrill, Mac Pherson, Franklin & Friel

[57] ABSTRACT

A mat structure and method of matting is disclosed, wherein a front mat is formed having a first opening. A second mat is formed having an opening smaller than the first opening in the front mat. A well mat is formed having an opening corresponding to the outer dimensions of the second mat and corresponding to the dimensions of a picture to be matted. A backing member is also provided. In a first configuration, the well mat is secured to the backing member. In a second configuration, the well mat is secured to the back of the front mat. In either configuration, a picture is positioned within the opening in the well mat so that, when the second mat is positioned in the well over the picture, the picture is secured in place by the second mat either opposing the backing member (in the first configuration) or opposing the back of the front mat (in the second configuration). The resulting structure comprising the front mat, second mat, well mat, picture, and backing member may then be framed.

3 Claims, 2 Drawing Sheets

MAT STRUCTURE AND METHOD OF MATTING A PICTURE

CROSS-REFERENCE TO RELATED APPLICATIONS

This application is a continuation-in-part (CIP) of my copending application Ser. No. 459,053, entitled "Mat Structure and Method of Matting a Picture," now Pat. No. 5,074,067.

FIELD OF THE INVENTION

This invention relates to an improved method and structure for matting pictures, and in particular to an improved method and structure for matting pictures to achieve proper alignment of the picture with respect to the mat.

BACKGROUND OF THE INVENTION

In the matting of a picture, in order to have the picture bordered by a mat to create an aesthetically pleasing effect, it is conventional for one to align the picture with respect to an opening formed in a front mat and then adhesively secure the aligned picture to the back surface of the front mat. Frequently, this is a difficult task, since the picture must first be viewed through the opening in the mat to align the picture, and then the picture must not be moved while it is being adhesively secured to the back surface of the mat.

A further drawback of the above method of matting is that the adhesive used to secure the picture to the mat frequently mars the picture if the picture is subsequently removed from the mat.

To overcome the drawbacks of prior art mat structures, I invented the mat structure described in my application Ser. No. 459,053 mentioned above. This patented mat structure allowed one to easily align pictures, especially photographs, with respect to an opening in a mat and secure the picture to the mat without any adhesives.

In this mat structure described in application Ser. No. 459,053, a front mat 10 in FIG. 1, having outer dimensions larger than a picture to be matted, is formed with a basically centered opening 12. A second mat 22, shown in FIG. 3, is formed to have an opening 18 equal to or smaller than the opening 12 in the front mat 10 and to have outer dimensions identical to the size of the picture to be matted. A third mat 16, shown in FIG. 3, of a size identical to the front mat 10 has an opening 20 with dimensions identical to the outer dimensions of the second mat 22 and, thus, has an opening identical to the size of the picture to be matted.

A solid back-side mat 24, shown in FIG. 4, is secured to the back surface of the third mat 16 so that the opening 20 in the third mat 16 forms a well. The picture, having identical dimensions as the well, is then placed within the well.

The second mat 22 is then placed over the picture in the well. This may be done by first securing the second mat 22 to the back of the front mat 10 and placing the structure over a picture 26 in the well, as shown in FIG. 5. Or, the second mat 22 by itself may be placed over the picture 26 in the well, and the front mat 10 then placed over the second mat 22.

Since the dimensions of the second mat 22 are equal to the dimensions of the well, the second mat 22 fits perfectly within the well and thereby secures the picture 26 within the well.

If picture 26 is a photograph or a relatively thin print, the top surfaces of the second mat 22 and third mat 16 will be approximately flush, and the front mat 10 will rest flat on both the second mat 22 and the third mat 16. When now set in a frame, the front mat 10 provides a slight downward force on the second mat 22 to firmly secure the picture 26 in place within the well.

Preferably, the second and third mats are formed from a single mat so that the same matting material is used in this mat structure as for double matting a picture using conventional matting techniques, where the double matting provides an inner mat border.

Although the above-described double matting structure is aesthetically pleasing, a user may want more of the picture image to be displayed than that provided by opening 18 in second mat 22. Instead, the user may want the larger opening 12 of the front mat 10 to be the picture border so as to reveal more of the picture.

SUMMARY OF THE INVENTION

In an alternate configuration of the separate mats used to form the double matting structure in my application Ser. No. 459,053, the third mat is first secured to the back of the front mat instead of to the back-side mat. Thus, a well is created on the back of the front mat identical to the size of a picture to be matted. The front mat having this well is then placed face down on a flat surface, and a photograph or other picture is then placed face down in the well so that the picture image would now be viewable through the relatively large opening in the front mat if the front mat were lifted.

To now secure the picture in place in the well without the use of adhesives or the like, the second mat, having outer dimensions equal to the well dimensions, is then placed over the back of the picture and set into the well so as to now be approximately flush with the third mat forming the well. The second mat may or may not include an opening, since only the peripheral portion of the second mat opposes the front mat with the picture therebetween.

A solid back-side mat is then placed over the second mat and third mat. This serves to supply a slight downward force to the back of the second mat and thereby secure the picture in place within the well.

The resulting single mat structure may then be framed.

If the second mat is identical to the second mat in my previous application (i.e., the second mat includes a central opening) and the front mat, second mat, third mat, and back-side mat are provided to the user unassembled, then the user now has a choice whether to use the double matting configuration described in my previous application (and lose some picture area to the double mat) or use the single mat configuration of the present invention (and display a maximum of picture area). Thus, this present inventive configuration, combined with my previous configuration, provides a very attractive, dual-configuration selling feature of an unassembled mat structure comprising the front mat, second mat, third mat, and back-side mat.

DETAILED DESCRIPTION OF THE PREFERRED EMBODIMENT

Description of Mat Dimensions

The description of FIGS. 1-5 is generally the same as in my previous application Ser. No. 459,053 and primarily relates to forming the individual mats which may be used in my previous mat structure or my present mat structure.

Figure 6:
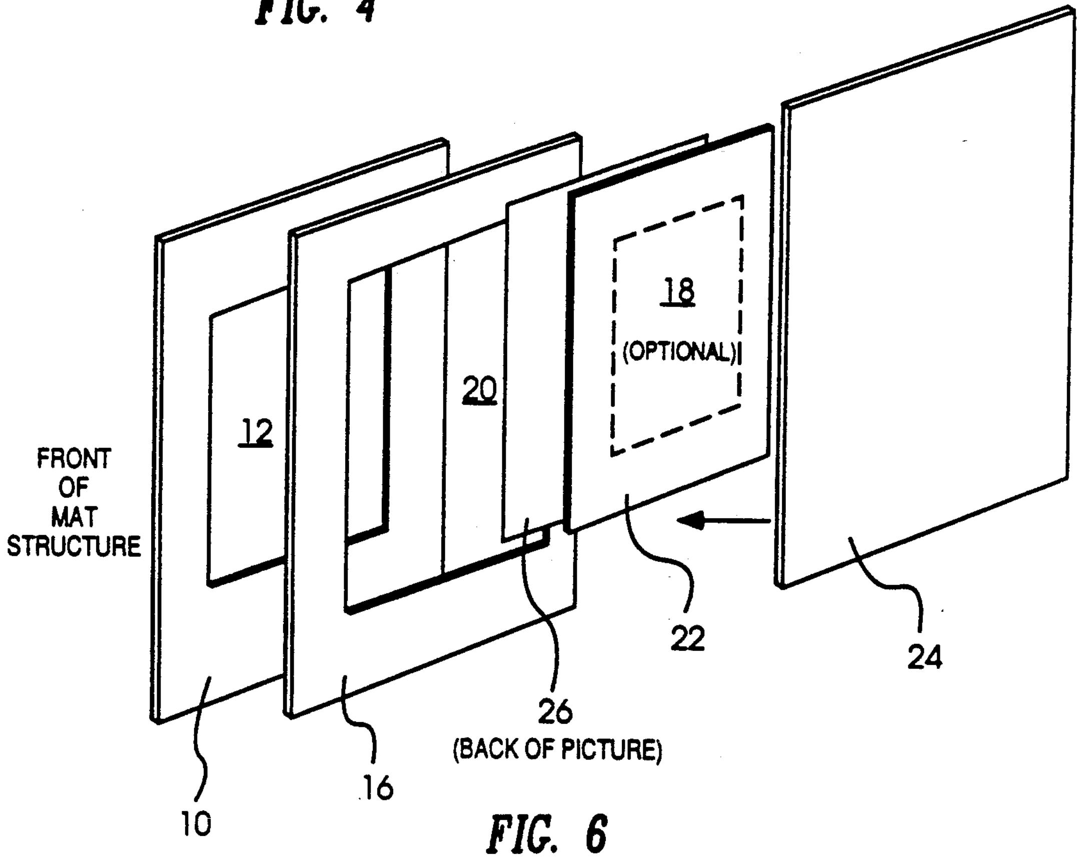
FIG. 6 is a perspective view of the various mats of FIGS. 1-4 used in the preferred embodiment of my present invention and their physical relationship to one another when assembling the mats in accordance with my present invention.

The description of FIG. 6 generally describes the new configuration constituting one embodiment of the present invention.

Figure 1:
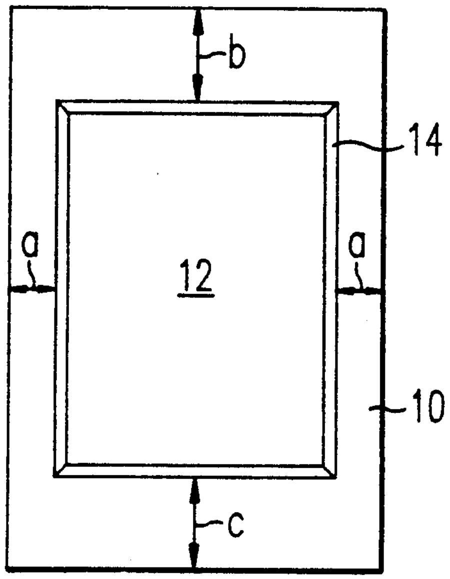
FIG. 1 shows a front view of a front mat which may be used in my previous or present embodiment.

FIG. 1 shows a conventional mat of the type comprising a plurality of laminations, which include an attractively textured front layer secured by means of an appropriate adhesive to a central filler layer, which is of generally greater thickness and comprised of a less expensive paper material. This mat will be referred to as front mat 10. In front mat 10, an opening 12 is formed which may be of any shape, but is shown in FIG. 1 as rectangular. Preferably, opening 12 is formed to have bevelled edges 14 for a more aesthetically pleasing effect and is generally formed using a guided razor means of the type typically used to cut mat openings or formed using an automated mat cutting machine. In FIG. 1, front mat 10 is shown to have left and right borders of width "a," an upper border of width "b," and a bottom border of width "c."

Generally, it is more aesthetically pleasing to provide a double mat structure for a picture, where the double mat comprises a front mat having a first opening, such as opening 12, and a second mat having a smaller opening through which the matted picture is viewed. FIGS. 2-6 relate to forming a double mat structure or a single mat structure using the same mat components.

Figure 2:
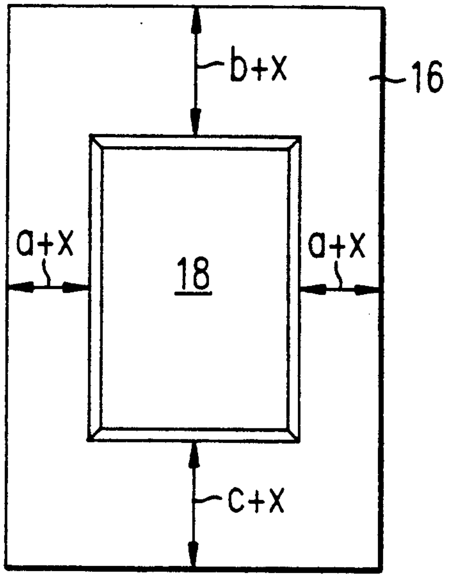
FIG. 2 is a front view of an interim mat before a cutting step which will transform the interim mat into a well mat and a second mat, which may be used in my previous or present embodiment.

In FIG. 2, interim mat 16 is shown having opening 18 cut out using a conventional guided razor means or an automated mat cutting machine. Preferably, opening 18 is made smaller than opening 12; however, opening 18 may be made to have approximately the same dimensions as opening 12, or even larger dimensions, if desired. The outer edge dimensions of interim mat 16 are preferably identical to the dimensions of front mat 10. In a preferred embodiment, the widths of the borders of interim mat 16 are greater than the widths of the borders of front mat 10 by increment "x," as shown in FIG. 2. Preferably, the edges of opening 18 are bevelled similar to bevelled edges 14 of opening 12.

Figure 3:
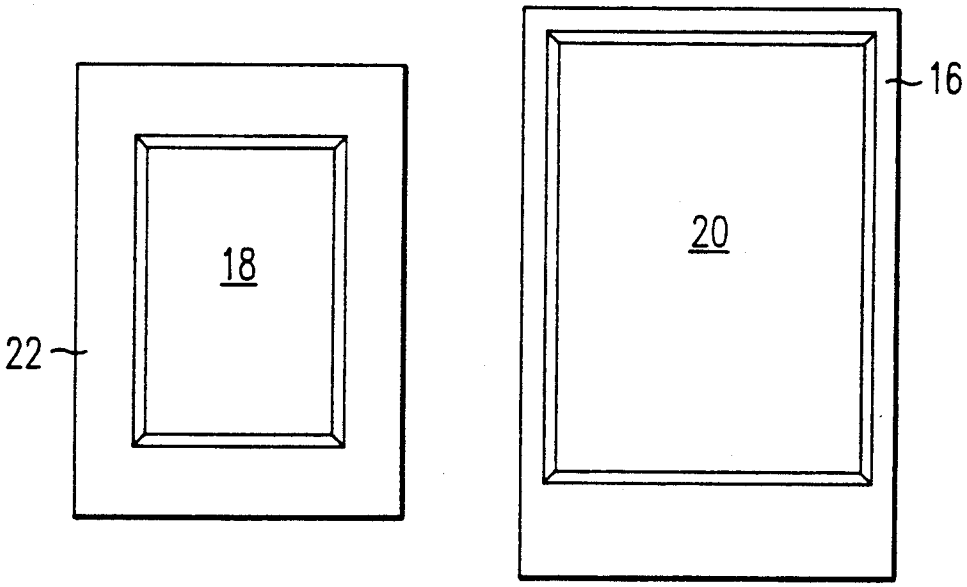
FIG. 3 is a front view of the well mat and the second mat cut-out, after the interim mat has undergone a cutting step, which may be used in my previous or present embodiment.
Figure 4:
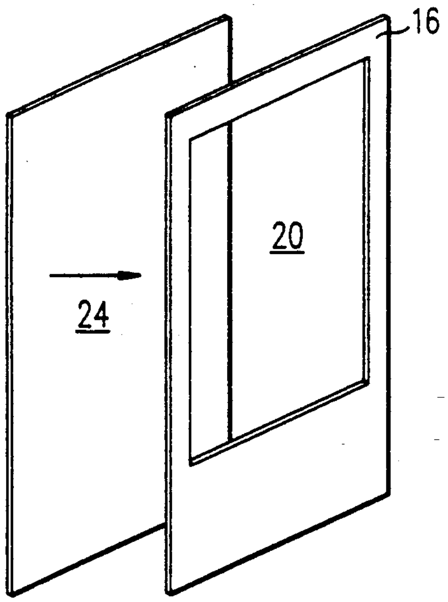
FIG. 4 is a perspective view of the mounting of a backing member onto the well mat conducted only for forming my previous embodiment.

In FIG. 3, interim mat 16 of FIG. 2 is shown having a central section cut out using a conventional guided razor means typically used for cutting mat openings or an automated mat cutting machine. The cut-out section will be referred to as second mat 22, and the portion of interim mat 16 which remains will be referred to as well mat 16. The resulting opening 20 in well mat 16, after removal of second mat 22, is made to have dimensions approximately identical to the outer dimensions of the picture to be matted.

In the preferred matting method, to determine the dimensions of opening 20, the picture to be matted is simply positioned over interim mat 16 in FIG. 2, and the corners of the picture are marked with a suitable means, such as a pencil. A guided razor or automated mat cutting machine may then be used to form opening 20 in well mat 16 of FIG. 3 corresponding to the size of the picture. In a commercial embodiment, opening 20 would be pre-cut to conform with various standard sizes of pictures, such as photographs. In one embodiment, the edges of opening 20 are bevelled inward toward opening 20.

In the structure of my previous invention in application Ser. No. 459,053, a backing member 24, shown in FIG. 4, having outer dimensions identical to the outer dimensions of well mat 16, is adhesively secured to the back of well mat 16. Opening 20 in well mat 16 thus forms a well having dimensions identical to the picture to be matted.

Figure 5:
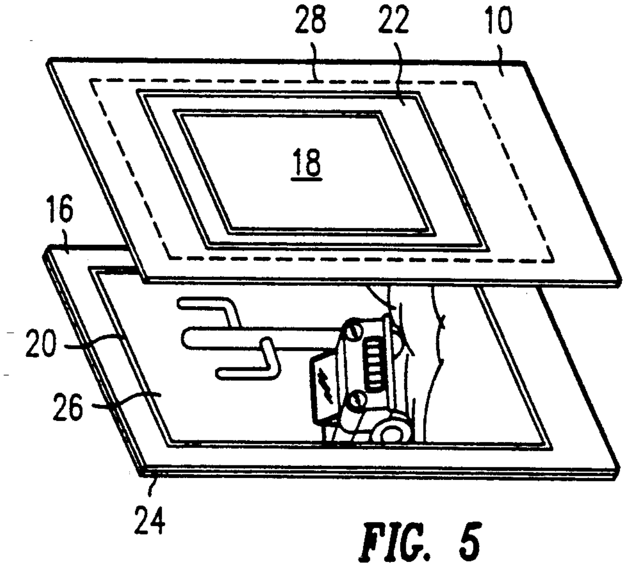
FIG. 5 shows the mounting of the front mat, having the second mat cut-out portion secured thereon, onto the well mat to secure a picture in place within the well, which is conducted only for forming my previous embodiment.

FIG. 5 is a perspective view of the structure in my previous application showing backing member 24 secured to the back of well mat 16 and picture 26 simply placed in the well created by opening 20. Front mat 10, having second mat 22 secured thereon, is placed over the front surface of well mat 16 so as to align second mat 22 with opening 20.

Preferably, second mat 22 is provided as a separate piece to a user and placed within the well over picture 26. Front mat 10 would then be placed over the resulting mat structure.

Since the dimensions of opening 20 necessarily match the outer dimensions of second mat 22, front mat 10 will now fit approximately flush against the top surfaces of well mat 16 and second mat 22, and the edges of picture 26 will be firmly secured between backing member 24 and second mat 22. In FIG. 5, the outer edges of second mat 22, obscured by front mat 10, are shown by dashed outline 28.

If picture 26 is desired to be removed from the mat structure of FIG. 5 at a later time, there is no adhesive to be removed from picture 26, and picture 26 will not be marred. By using this structure of my previous application, picture 26 is perfectly aligned with opening 18, and no additional mat materials are necessary other than those which would be necessary for a conventional double matting.

This structure and method can of course be applied to mats and mat openings having various shapes and size.

Description of New Mat Arrangement of FIG. 6

FIG. 6 shows the mat portions, and novel configuration of these mat portions, constituting the present invention. Shown in FIG. 6 are front mat 10, well mat 16, picture 26, second mat 22 with opening 18 shown as optional, and back-side mat 24.

These mats may be identical to the identically named and numbered mats shown with respect to FIGS. 1-4. Second mat 22, however, may be formed with an opening 18 or as a solid mat. As will be seen, if second mat 22 is formed with opening 18, the separate mats of FIG. 6 may also be used to form the double matting structure of FIG. 5. The matting configuration of FIG. 6 forms a single mat structure, where the image on picture 26 is visible through opening 12 of the front mat instead of through the smaller opening 18 in the configuration of FIG. 5. Thus, the configuration of FIG. 6 would be used when a larger picture area is desired to be displayed or if double matting is otherwise not desired.

To mat a picture using the preferred embodiment mat configuration of FIG. 6, well mat 16 is first secured to the back of front mat 10 using an appropriate adhesive, thus forming a well having an opening 20. Front mat 10, with well mat 16 secured thereto, is then laid face down on a flat surface. Opening 20 is approximately the same size as the dimensions of picture 26 so that picture 26 may then be placed within opening 20. Since opening 12 is smaller than opening 20, picture 26 will be supported around its periphery by front mat 10.

To now secure picture 26 within the well and against the back of front mat 10, second mat 22 is now placed over the back of picture 26 within the well. Second mat 22 is of an identical size as the well and picture 26, and thus the back of second mat 22 when placed in the well will be approximately flush with the back of well mat 16. This assumes that picture 26 is a photograph, print, or the like comprising a fairly thin sheet. If picture 26 is of a thick material, the relative thicknesses of well mat 16 and second mat 22 would be selected accordingly. For example, if the thickness of picture 26 were similar to the thickness of a standard mat, perhaps two identical well mats 16 would be placed on top of one another so that the back surface of second mat 22, when placed within the well over the picture, will remain flush with the surface of well mat 16.

An opening 18 (shown in dashed outline in FIG. 6) in second mat 22 is optional in the configuration of FIG. 6, since only the peripheral portions of second mat 22 are utilized to press the edges of picture 26 against the back of front mat 10. In the preferred embodiment, second mat 22 includes an opening 18 so that second mat 22 may be also used in the double matting structure of FIG. 5.

Back-side mat 24 is then placed over the resulting structure so as to press second mat 22 against photograph 26 to firmly secure photograph 26 within the well and against the back of front mat 10.

The resulting mat structure may then be framed.

In the preferred embodiment, second mat 22 is formed with opening 18 and all pre-cut mat components are provided in a package to a user. Well mat 16 is provided with one surface having a double stick tape already secured thereon with a removable backing for the tape. The user can then simply remove this tape backing to reveal the underlying tape adhesive and either secure well mat 16 to back-side mat 24 to form the double matting structure of FIG. 5, or secure well mat 16 to the back of front mat 10 to form the single mat structure of FIG. 6.

No other known structure enables such flexibility to form either a double matting structure or a single matting structure without any waste of matting materials. This dual function of a set of pre-cut mats has enormous commercial potential, since a user may now have the option of matting a picture, such as a photograph, using a double mat (displaying a limited amount of picture area) or a single mat (displaying a maximum amount of picture area).

The specific embodiments herein described are only illustrative of the invention. Other embodiments using the above-described concepts are also intended to be encompassed by the invention. Various other changes in structure may additionally occur to those skilled in the art, and all of these changes are to be understood as forming a part of the invention insofar as they fall within the true spirit and scope of the following claims.

I claim:

1. A mat kit, exclusive of a picture to be matted, containing a set of mats for forming two different mat structures for providing a border around a picture having outer dimensions, said mat kit comprising:

a first mat having a first opening and having a back surface;

a second mat having outer dimensions, said second mat having a second opening, said second opening being smaller than said first opening;

a third mat having a front surface, said third mat having a third opening extending through an entire thickness of said third mat, said third opening having dimensions approximately equivalent to said outer dimensions of said second mat, said dimensions of said third opening also being larger than dimensions of said first opening; and a backing member, said two different mat structures comprising:

a first mat structure having said third mat positioned on said back surface of said first mat so that said front surface of said third mat directly abuts said back surface of said first mat, a picture having said outer dimensions positioned within said third opening, said second mat positioned within said third opening so that said second mat opposes said back surface of said first mat through said third opening with said picture pressed therebetween, and said backing member positioned over said second mat and said third mat; and a second mat structure having said third mat positioned on a top surface of said backing member so that said front surface of said third mat directly abuts said top surface of said backing member, said picture having said outer dimensions positioned within said third opening so that said second mat opposes said top surface of said backing member with said picture pressed therebetween, and said first mat positioned over said second mat and said third mat.

2. The structure of claim 1 wherein said first opening has bevelled edges.

3. The structure of claim 1 wherein said third opening has bevelled edges, and outer edges of said second mat have bevelled edges, wherein said bevelled edges of said third opening and said bevelled outer edges are capable of coinciding.

* * * * *